United States Patent [19]

Tanaka et al.

[11] 4,328,327

[45] May 4, 1982

[54] CONTINUOUS BULK POLYMERIZATION PROCESS FOR PREPARING COPOLYMER OF AROMATIC VINYL MONOMER AND MALEIC ANHYDRIDE

[75] Inventors: Atsushi Tanaka, Himeji; Toshiyuki Chiba, Sakai; Hirotaka Miyata, Himeji, all of Japan

[73] Assignee: Daicel Chemical Industries, Ltd., Osaka, Japan

[21] Appl. No.: 196,705

[22] Filed: Oct. 14, 1980

[30] Foreign Application Priority Data

Oct. 15, 1979 [JP] Japan ................................. 54/132553

[51] Int. Cl.$^3$ ............................................. C08F 220/08
[52] U.S. Cl. ........................................ 526/66; 526/65; 526/272
[58] Field of Search ............................ 526/65, 66, 272

[56] References Cited

U.S. PATENT DOCUMENTS 3,859,268 1/1975 Novack et al. ........................ 526/65
4,048,413 9/1977 Wilkens ................................ 526/65
4,141,934 2/1979 Wingler et al. ...................... 526/65

Primary Examiner—Paul R. Michl
Attorney, Agent, or Firm—Blanchard, Flynn, Thiel, Boutell & Tanis

[57] ABSTRACT

In a continuous bulk polymerization process of a styrene type copolymer which is a copolymer consisting of 60 to 95% by weight of an aromatic vinyl monomer and 40 to 5% by weight of maleic anhydride, a continuous bulk polymerization process of a styrene type copolymer characterized in that at the first stage, continuous bulk polymerization is carried out using a vertical agitation system polymerization apparatus to a conversion of 30 to 60% by continuously feeding a mixed monomer of the aromatic vinyl monomer and maleic anhydride having a feed composition ratio corresponding to the copolymer, and at the second stage, and at the third stage, if necessary, continuous bulk polymerization is carried out to a conversion of 60 to 95% using a horizontal apparatus for processing highly viscous substances, equipped with one or two rotary shafts having agitation blade frames or agitation blades impaled thereon, by continuously and dividedly feeding maleic anhydride from plural feed ports disposed on said apparatus for processing highly viscous substances.

9 Claims, 3 Drawing Figures

CONTINUOUS BULK POLYMERIZATION PROCESS FOR PREPARING COPOLYMER OF AROMATIC VINYL MONOMER AND MALEIC ANHYDRIDE

This invention relates to a novel continuous bulk polymerization process of a styrene type copolymer. More specifically, the present invention relates to an improvement in a production process of an aromatic vinyl monomer-maleic anhydride copolymer having a uniform copolymer composition by continuous bulk—or continuous solution-copolymerization. The present invention provides a process for producing a copolymer resin in which the proportion of maleic anhydride to the aromatic vinyl monomer-maleic anhydride copolymer is up to 40% by weight and which has suitable properties as a thermoplastic material.

A styrene-maleic anhydride copolymer having an about 50:50 composition by weight has been produced on an industrial scale for a fairly long period of time and hence, has been well known as a water-soluble polymer. However, resins belonging to this group are not suited for use as a thermoplastic material because they involve problems in regard to their water absorbance and moldability. As a plastic material for molding, copolymers containing 5 to 40% by weight, preferably 5 to 30% by weight, of maleic anhydride are suitable. Because of high heat deformation resistance, these resins have drawn increasing attention in recent years. As is well known in the art, however, in the radical copolymerization reaction between styrene and maleic anhydride, a so-called "alternating copolymer" is apt to be formed in which styrene and maleic anhydride are polymerized alternately to one another. Hence, it is not so easy to produce the above-mentioned random copolymer having a relatively small maleic anhydride content under such a condition as to provide the copolymer having the uniform composition.

In other words, the monomer ratio required for providing a copolymer having an intended composition can be calculated from the known theory of copolymerization. Nonetheless, in order to obtain the abovementioned copolymer having a composition in which the maleic anhydride content is smaller than 40% by weight, copolymerization must generally be started from a monomer mixture having a composition in which the proportion of maleic anhydride is extremely small and moreover, maleic anhydride must be added sequentially in accordance with the progress of the copolymerization in order to produce the copolymer having a predetermined composition during progress of the polymerization. Batch processes have been employed at present for producing the abovementioned copolymer so as to practice these complicated polymerization techniques, and a solution-precipitation process has principally been used. An aqueous suspension polymerization process and an emulsion polymerization process, that are frequently employed on an industrial scale, can not be employed in this case because maleic anhydride reacts with water.

The batch type solution precipitation polymerization process requires considerably great quantities of solvent so that the rate of polymerization generally tends to lower, and a considerably great quantity of polymerization initiator is required to adjust the rate of polymerization. Hence, this process involves the drawbacks that impurities, such as the solvent and the precipitation-granulating agents, that is, a suspension-stabilizer, tend to remain inside the polymer and since these impurities are difficult to remove, coloration of the resin tends to occur when the resin is heated. From the aspect of production efficiency, too, lowering of the volume efficiency is unavoidable and fluctuation of polymer qualities tends to occur between lots because it is a batch process.

If such a copolymer resin could be produced in accordance with a continuous bulk polymerization process, the process would undoubtedly be extremely advantageous in the aspects of production cost, quality of the product and stability of the quality. The technical problems to be solved in this instance are to find out rational operation procedures for ensuring the uniform copolymer composition as described already and to establish the required process.

A number of patents have been filed and have become known to the public in regard to continuous bulk polymerization processes of various vinyl monomers, both processwise and apparatus-wise. According to these patents, however, there yet remains the aforementioned problem that the copolymer composition tends to become non-uniform during the progress of polymerization. However, these patents hardly teach or suggest the production techniques of the continuous bulk polymerization of the aromatic vinyl monomer-maleic anhydride copolymer. Among them, a patent application entitled "Continuous Bulk Polymerization Process" is laid open to the public as Japanese Patent Laid-Open No. 119786/1976 (applicant: Bayer A. G.). The gist of this patent application is as follows.

In continuous production of a thermoplastic molding composition consisting of:

A. 22 to 96 mol% of styrene or α-methylstyrene;
B. 0 to 78 mol% of a mono-olefinic monomer containing a nitrile group; and
C. 0 to 50 mol% of a mono-olefinic unsaturated monomer different from said monomer B;

a continuous production process characterized by the steps of:

copolymerizing, at the first stage, a monomer mixture of a mixing ratio of $A_1$, $B_1$ and $C_1$ to a conversion of 10 to 60 mol% inside a tank reactor, in which a continuous flow is ideally mixed, for a predetermined average residence time and mixing time in the presence of an initiator having a specific half-life time;

adding, at the second stage, a monomer mixture of a mixing ratio of $A_2$, $B_2$ and $C_2$ (where the sum of the mol% of $A_1$, $B_1$ and $C_1$ and that of $A_2$, $B_2$ and $C_2$ are 100, respectively), an initiator and the like; and causing, at the third stage, the reaction mixture to flow over the entire capacity of a completely dismountable, self-cleaning type polymerization kneader, carrying out continuous polymerization in the homogeneous phase of the bulk while reverse-mixing at the predetermined temperature for the predetermined residence time and mixing time, and continuously withdrawing the residual monomer till the residual monomer content becomes below 0.5% by weight by applying vacuum or by blowing an inert gas.

As can be seen clearly from the abovementioned gist of the invention, this prior patent application may be evaluated as an improved technique which applies a novel contrivance to the addition of the monomer mixture and the initiator at the second stage while paying specific attention to the adjustment of the copolymer composition in the continuous bulk polymerization. However, the use of the completely-mixing type kneader polymerization reactor at the third stage would render the variance of the copolymer composition further complicated, on the contrary. In the case of the copolymerization of styrene-maleic anhydride, for example, maleic anhydride, which is consumed faster with the progress of polymerization reaction, must be added sequentially. If the polymerization is carried out using the perfectly mixing type reactor in which polymerization solutions having different propagation rates of polymerization are being mixed, the fluctuation of the composition would become extremely great and complicated, thus forming a copolymer product having a wide distribution of compositions even if the average residence time is shortened.

Example 6 of the prior patent application illustrates the production of a styrene-maleic anhydride copolymer.

Instantaneously-formed copolymer compositions are calculated for monomer mixtures for a few composition ratios using the Q.e. values of styrene and maleic anhydride, which Q.e. values are well known from copolymerization theory, and changes of the compositions with the progress of polymerization are calculated. The results are shown in FIG. 1. Drastic changes in the maleic anhydride content can be observed. It is to be expected that the total reaction product of the copolymerization system having such a significant change in the composition would be heterogeneous in composition.

Next, in the continuous bulk polymerization process, a process using an apparatus of the perfect mixing type, that is, a continuously stirred tank for highly viscous substances at the first stage and a horizontal (surface-renewal type) apparatus for highly viscous substances at the second and/or the third stage is known from Japanese Pat. No. 46871/1978 (applicant: Mitsubishi-Jukogyo K.K.), for example. The polymerization reaction is performed using plural, horizontal, parallel, rotary shafts, on each of which are mounted plural agitation plates, and the shafts are rotated in opposite directions inside a cylinder. The prior invention relates to a polymerization process characterized in that a non-solvent (mainly water) having a boiling point lower than that of the polymerization solution is sprayed in an adjusted quantity, is evaporated and is withdrawn outside the cylinder so as to carry out the polymerization reaction under the adjusted temperature condition. The prior invention relates also to a process for producing a polymer characterized in that the polymer obtained by the abovementioned process is fed into a cylinder, in which plural rotary shafts, arranged horizontally in parallel to one another and equipped with plural agitation blades, are rotated in opposite directions to one another, and volatile substances are removed by heating while the inside of the cylinder is preferably held under reduced pressure.

As is obvious from these disclosures, the horizontal apparatus for processing highly viscous substances is adapted to the process for improving the heat-removing efficiency of the polymerization solution in the continuous bulk polymerization and the removing efficiency of the volatile substances by utilizing the characteristic of the liquid surface renewing action of the highly viscous liquid. The procedures of spraying and evaporating the water is in perfect conformity with this concept. In other words, the process of this prior invention pays no consideration at all to the maintenance of the uniform copolymer composition to which the present invention is directed.

As described in detail in the foregoing, hardly any process techniques are known concerning the continuous bulk polymerization of a copolymer of an aromatic vinyl monomer and maleic anhydride in which the monomer unit contents of the copolymer may be very constant in view of the progress of the polymerization. The inventors of the present invention have carried out intensive studies and have now completed the present invention.

Figure 1:
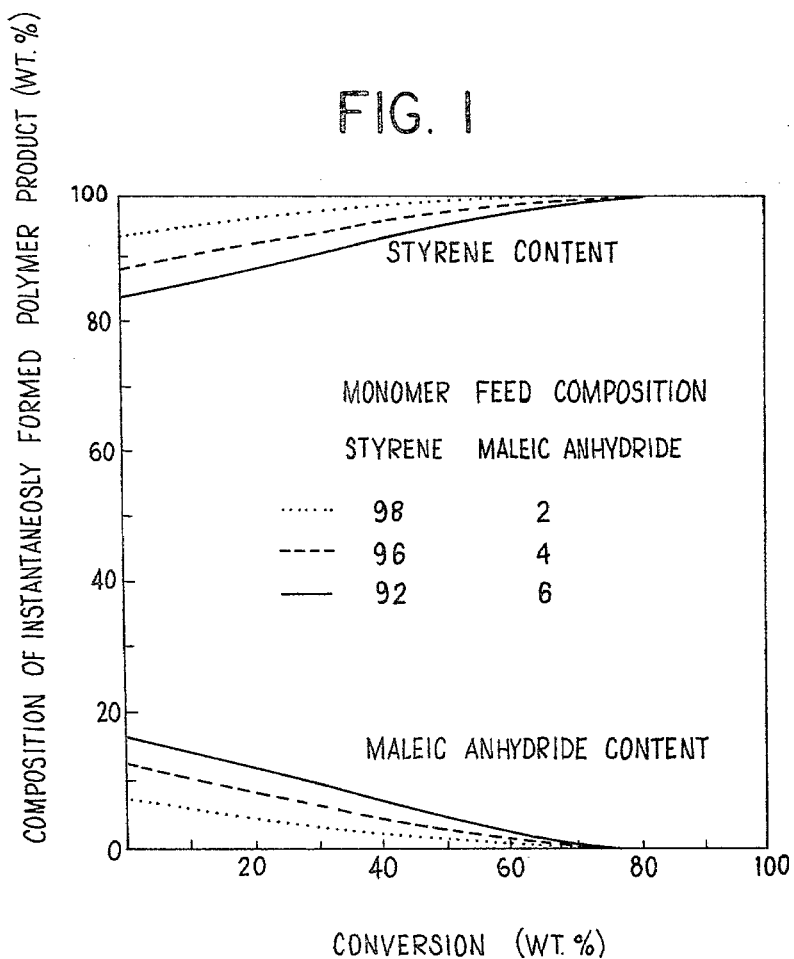
FIG. 1 is a graph showing the change of the composition of the instantaneously-formed polymer product with the progress of copolymerization of styrene-maleic anhydride mixed monomers.

1. feeding of maleic anhydride
2. feeding of aromatic vinyl monomer
3. first stage reactor
4. pump
5. horizontal reactor of one shaft
6. horizontal reactor of two shafts
7. shaft

SUMMARY OF INVENTION

The invention provides a continuous bulk polymerization process for preparing a styrene type copolymer, which is a copolymer consisting of 60 to 95% by weight of an aromatic vinyl monomer and 40 to 5% by weight of maleic anhydride, which process is characterized in that in the first stage, continuous bulk polymerization is carried out, using a vertical agitation system polymerization apparatus, to a conversion of 30 to 60% by continuously feeding a monomer mixture of the aromatic vinyl monomer and maleic anhydride having a feed composition ratio corresponding to the composition of the copolymer, and in the second stage, and in the third stage, if necessary, continuous bulk polymerization is carried out to a conversion of 60 to 95%, using a horizontal apparatus for processing highly viscous substances, equipped with one or two rotary shafts having a plurality of agitation blade frames or agitation blades mounted thereon, by continuously and dividedly feeding maleic anhydride from plural feed ports disposed on said apparatus for processing highly viscous substances.

Next, the process of the present invention will be outlined. First, in performing the continuous polymerization, the stage of shifting to continuous operation from the start-up of the polymerization becomes a subject of consideration. One of the ideas is to employ those procedures which are customarily employed for the continuous polymerization and which comprise the steps of continuously introducing a monomer mixture having a predetermined composition into a polymerization apparatus, heating the monomer mixture while it is flowing through the apparatus, maintaining a percentage of solid content (conversion) after the percentage of the solid content in a preparatory polymerization tank reaches a predetermined value, adjusting the monomer composition to such a mixing ratio as to provide a desired copolymer composition and introducing the monomer mixture. In the case of the copolymerization system of the present invention, in which fluctuation of the copolymer composition is substantial as described above, it is preferred to employ the following procedures in order to reach the steady state within a relatively short period of time.

A monomer mixture having such a composition ratio as to form an instantaneously-formed copolymer having a predetermined composition calculated from the values of the monomer reactivity ratios $r_1$ and $r_2$, which reaction ratios are well known from the copolymerization theory, is fully charged into the first stage (preparatory) polymerization tank, is then heated to a predetermined temperature thereby to initiate the polymerization. Immediately thereafter, maleic anhydride is sequentially added at intervals of 40 minutes or shorter in the amounts calculated from the following equation (1) until the polymerization proceeds to a predetermined percentage of solid content (conversion) within the range of 30 to 60% by weight.

The amount of maleic anhydride to be sequentially added =

$$W_o \cdot r \cdot \left(1 - \frac{P_1}{K_1}\right) \cdot \left(1 - \frac{P_1}{K_1} \cdot r\right)^{m-1} \quad (I)$$

where
- $W_o$: total monomer amount initially fed (Kg)
- r: rate of polymerization (Kg/Kg/unit time)
- $K_1$: percentage of aromatic vinyl monomer in the monomer initially fed (weight ratio)
- $P_1$: percentage of aromatic vinyl component in the formed copolymer (weight ratio)
- m: frequency of addition of maleic anhydride.

After the reaction system reaches the predetermined steady percentage of the solid content, it is preferred to start the continuous polymerization by immediately and continuously introducing the monomer mixture, having the composition calculated by the equation (II-a) below, in the amount calculated by the equation (II-b) below, while keeping the temperature at the predetermined temperature, continuously withdrawing the same amount of the polymerization solution and transferring it to the polymerization apparatuses of the second and subsequent stages. In this case, it is of course possible to mix and introduce a small amount of a solvent together with the monomer mixture. Monomer composition ratio to be continuously introduced (weight ratio):

$$\frac{Sa}{Ma} = \frac{K_1 - P(K_1 - P_1)}{1 - K_1 + P(K_1 - P_1)} \quad \text{(II-a)}$$

Amount of introduction:

$$W \cdot r \cdot (1/P - 1)/t \quad \text{(II-b)}$$

- Sa/Ma: aromatic vinyl-maleic anhydride monomer composition ratio to be continuously introduced
- P: steady conversion to be started to continuous polymerization (solid content)
- W: total feed quantity (same as $W_o$ of eq. (I))
- r: rate of polymerization (Kg/Kg/unit time)
- t: the same time as that used as the unit of the rate of polymerization r
- $P_1$, $K_1$: same as those of eq. (I)

This first stage (preparatory) reaction vessel is a vertical-agitation-system, polymerization reactor equipped with a monomer feed port, a discharge port for the polymerization solution, an agitator and means for transferring the heat of reaction (jacket, and/or cooling coil, etc.). As the agitator or stirrer, it is preferred to use various blade types, such as a turbine type, a fan turbine type, an astern blade type, Boulmagine type, a helical band blade type, a helical shaft type (equipped with a draft tube), and so forth. The polymerization temperature is generally from 80° to 160° C., preferably from 100° to 150° C. Satisfactory results could be obtained if the polymerization pressure is from 0 to 2 Kg/cm² in terms of gauge pressure.

The solid content (conversion) in the first stage polymerization tank (preparatory polymerization tank), before shifting to the continuous polymerization, is to be suitably selected in accordance with the agitation capacity of the tank and its heat-removing capacity. It is generally selected within the range of 30 to 60%. The average residence time of the monomer mixture fed continuously should be decided in conjunction with the equation (II-b), but it is generally within the range of from 0.2 to 10.0 hours. As another embodiment of the invention, the first stage of the polymerization may use two or more vertical reactors.

As the apparatus to be used at the second stage, and at the third stage, if necessary, the use of an agitation tank would quite naturally be considered in view of the addition of the monomer. However, as the conversion (solid content) rises, the viscosity of the system becomes extremely high. For example, the viscosity of the system at the solid content (%) of near 80% is as high as 10,000 to 30,000 poises. For this reason, agitation by means of vertical shafts suspended from the upper portion of the tank is nearly impossible so that removal of the reaction heat as well as temperature control become extremely difficult. In addition, it becomes difficult to mix rapidly and uniformly the monomer to be added to the reaction system and thus to prevent the drastic change of the composition. After all, not a couple, but a great number, of tanks of small capacity must be connected to one another. Such an arrangement would naturally lead to a great economical disadvantage.

The inventors of the present invention have come to accomplish the present invention by using a horizontal apparatus for processing highly viscous substances, as a polymerization apparatus, which is furnished with agitation force capable of agitating high viscosity materials and which provides substantially the same effect as is brought forth by a number of small tanks connected to one another.

The one-shaft type and the two-shaft type are available for use as such a horizontal reaction apparatus and the shape and number of blades to be fitted to the shaft are disclosed in Japanese Pat. Nos. 12484/1970, 22449/1967 and 20433/1971, U.S. Pat. No. 2,758,915, Japanese Pat. Nos. 16901/1969, 40732/1974 and 46871/1978, and Japanese Patent Laid-Open Nos. 102894/1973 and 86590/1975, for example. Hence, they should be selected suitably in accordance with the conditions of the polymerization reaction, the viscosity of the system, and so forth. The preferred number of blade frames or blades per unit is from 2 to 40. Since the shaft equipped with such a number of blades or blade frames is sufficiently supported by both ends of the apparatus, it is capable of sufficiently agitating the polymerization solution. Moreover, this agitation effects one form of agitation to take place inside a perfectly mixed tank in the direction at right angles to the shaft, that is to say, within the zones partitioned by the blades or the blade frames, and the other form of a piston flow with respect to the apparatus as a whole, that is to say, in the axial direction.

Realizing the feature of the apparatus, the present invention contemplates utilizing the apparatus for controlling the copolymer composition of a copolymer. This is one of the essential features of the present invention. In other words, one of the essential points of the present invention resides in that maleic anhydride, in amounts calculated by the following equation (III), is continuously added to the polymerization solution flowing continuously through such a horizontal apparatus in each polymerization zone partitioned by the blades or blade frames in order to facilitate the accurate control of the copolymer composition.

Amounts of maleic anhydride to be added =

$$\frac{Z_o(1 - C_o)\left(1 - \frac{P_1}{X}\right)\tau r'}{\left(\frac{P_1}{X}\tau r' + 1\right)^n} \quad (III)$$

where:
- $Z_o$: amount of solution fed to second or third stage polymerization apparatus
- $C_o$: percentage of polymer content in the solution fed to second or third polymerization apparatus
- n: the number of tanks (n: 1, 2 ... n, the maximum of n corresponds to equivalent number of perfectly mixed tanks)
- $P_1$: percentage of aromatic vinyl monomer in copolymer inside second or third stage polymerization apparatus (weight ratio)
- X: average percentage of aromatic vinyl monomer in monomers inside second or third stage polymerization apparatus (weight ratio)
- $\tau$: residence time (hr)
- $r'$: rate of polymerization (Kg/Kg/hr)

It is possible to add maleic anhydride in the amounts calculated by the abovementioned equation (III) to the polymerization solution in each polymerization zone by spraying or injecting it from a feed port at the upper portion of the apparatus or from a pressure-feed port at the lower portion of the apparatus.

Generally, the polymerization conversion in each polymerization apparatus varies with the solid content (steady polymerization ratio) in the reaction mixture fed from the first stage polymerization tank and it is determined whether the polymerization is terminated at the second stage or is continued to the third stage. Generally speaking, however, it is preferred to select such operating conditions that when the steady polymerization ratio in the first stage polymerization tank is from 30 to 60%, it is from 40 to 80% in the second stage apparatus and from 60 to 95% in the third stage apparatus. It is suitable to carry out the polymerization at the second stage and/or the third stage at the temperature within the range of 80° to 180° C., preferably 100° to 160° C. The polymerization can be carried out at a considerably reduced pressure or a considerably elevated pressure inside the polymerization apparatus and a pressure within the guage pressure of −0.8 to 3 Kg/cm² is preferred.

The foregoing description has dealt with the case wherein only maleic anhydride is to be supplemented, with reference to the equations (I) and (III), in order to adjust the composition of the resulting copolymer because maleic anhydride is consumed relatively quickly in the copolymerization system. Since maleic anhydride is solid at room temperature and is hygroscopic, however, it is not so easy to feed quantitatively the same. Accordingly, in most cases, it is more advantageous to feed the monomer in the solution form, if possible. In such a case, it is also possible to introduce a maleic anhydride solution in an amount corresponding to the amount calculated from the equations (I) and (III) by dissolving maleic anhydride in toluene or ethylbenzene, for example. Nonetheless, it is often undesirable that such an inert third component, that is to say, the solvent, is present in the polymerization system in great quantities. To cope with this problem, it is also possible to add maleic anhydride as a solution dissolved in the aromatic vinyl monomer, that is to say, as the monomer mixture, containing a desired amount of maleic anhydride. In this case, the copolymerization system would naturally become further complicated so that the following conditions are necessary:

(A) Mixed monomer composition: maleic anhydride/aromatic vinyl monomer (weight ratio) must fall within the range of 11/89 to 99/1.

(B) The residence time in each completely mixed tank of the second and third polymerization apparatuses must be almost constant and equal to one another.

On the abovementioned conditions, the mixed monomer amount calculated from the following equation may be introduced additionally.

Mixed monomer amount to be additionally supplemented at the start of the first stage polymerization tank =

$$W_o \cdot K_1 \cdot \left\{1 - r + \left(\frac{K_1 - P_1}{K_1 - G}\right)r\right\}^{m-1} \cdot \left(\frac{K_1 - P_1}{K_1 - G}\right) \cdot r$$

where G: percentage of aromatic vinyl monomer in mixed monomer to be additionally supplemented.

Mixed monomer amount to be supplemented in second and third stage polymerization apparatuses =

$$Z_o(1 - C_o)\left(1 - \frac{P_1}{X}\right) \cdot \tau \cdot r' \left(1 - \frac{G}{X}\right)^{n-1} \cdot$$

$$\left\{\left(1 + \frac{P_1}{X} \cdot \tau r'\right) - \frac{G}{X}(1 + \tau \cdot r')\right\}^{-n}$$

where the symbols have the same meaning as defined in the equation (I) or (III).

If it is troublesome to introduce a monomer or mixed monomers in the amount calculated from the above, per each perfectly mixed tank, or if there is any restriction in the used apparatus, it is preferable that 2 to 5 of said perfectly mixed tanks are considered to form one block. The average value of the amount of as described above, for the entire block of the amounts obtained above, is added to each completely mixed tank. Alternatively the total amount, as summed for said block, of the monomer is added at one port of said block. In either case, the number of blocks is two or more.

After all, consideration should be made so that the addition amount of maleic anhydride has progressively decreasing gradients for the whole polymerization system.

As discussed above, the process exactly operated according to the above shown formulae, I, IIa, IIb, III and variations thereof can obtain the best result. It is permitted in the invention, however, that each calculate value of monomer amounts may vary within a range of up to 20%, preferably 10%, above or below from the value calculated by the formula.

The polymerization solution that contains a high solid content and has been taken out from the second or third stage polymerization apparatus is transferred to an evaporator to remove and recover volatile components while the polymer, as the solid content, is passed through an extruder and is thus granulated. There is no specific restriction on these post-treatment steps and suitable instruments or apparatuses may be suitably selected in accordance with the final shape of the resin or with the target value of the residual volatile components. As the evaporator, it is preferred to employ a centrifugal membrane (thin film) evaporator, for example.

As the aromatic vinyl monomer to be used in the present invention, styrene, α-methylstyrene and halogenated styrene or their mixtures can be illustrated.

According to the invention, there may be used a third monomer, other copolymerizable monomers such as vinyl cyan like acrylonitrile, acrylic acid and its ester, for example methyl ester, methacrylic acid and its ester, for example methyl ester, and a rubber-like polymer ingredient such as polybutadiene and styrene-butadiene rubber. Two or more kinds of the third monomers may be used. The amount of the third monomer is preferably from 0 to 30 wt.%, based on the total amount of the monomers.

In practicing the polymerization of the present invention, it is possible to add suitable amounts of a polymerization initiator or a molecular weight-adjusting agent. However, if the purity of the copolymer resin is a critical issue, it is better not use these agents, or, even if they are used, that their amounts be reduced to the greatest possible extent. The solvent, which is to be added to the system, whenever necessary, is preferably an hydrocarbon inert to the polymerization system, such as benzene, toluene, xylene, ethylbenzene, p-cymene and the like, but there is no restriction on the solvent, in particular.

The viscosity of the solution of the aromatic vinyl monomer-maleic anhydride copolymer in the present invention is from 0.5 to 1.0, preferably 0.6 to 0.9 dl/g. The solution viscosity ($\eta$sp/c) is measured in a tetrahydrofuran solution (0.5 wt.% conc.) at 30° C.

Hereinafter, an example of the present invention will be illustrated.

EXAMPLE

100 Kg of a styrene-maleic anhydride monomer mixture having a mixing ratio (weight ratio) of 0.993/0.007 was fed into a first stage polymerization tank (preparatory polymerization tank) having a helical band type agitator and was heated to 140° C. with stirring in a nitrogen stream. After 10 minutes from the elevation of the temperature to 140° C., 0.56, 0.53, 0.50, 0.48 and 0.45 Kg of maleic anhydride were added in 10 minute intervals. These amounts were calculated from the equation (I) with the rate of reaction r=0.06 (Kg/Kg/10 min.). At the time when the addition of maleic anhydride was completed at 50 minutes from the start, a styrene-maleic anhydride monomer mixture having a mixing ratio (weight ratio) of 0.965/0.035 was continuously introduced at a rate of 85.8 Kg/hr and the polymer solution in substantially the same amount was withdrawn and was transferred to the second stage polymerization apparatus. The monomer composition and the feed amount were calculated from the equations (II-a) and (II-b) with r=0.06 (Kg/Kg/10 min.) in the same way (with the proviso that $P_1$=0.9).

Figure 2:
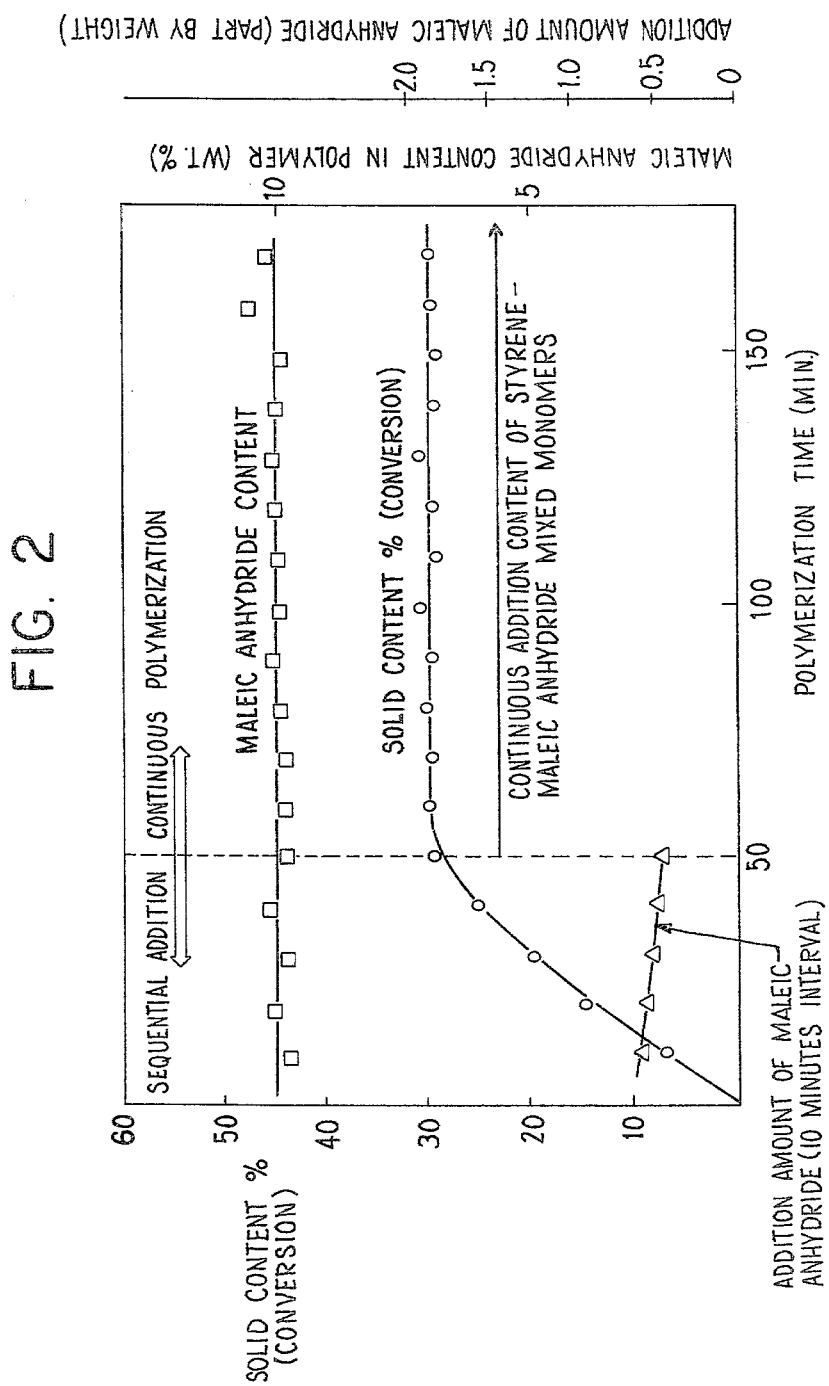
FIG. 2 is a graph showing the results of analysis of the polymerization system from the start of polymerization till the passage of about 180 minutes in accordance with the example of the present invention.
Figure 3:
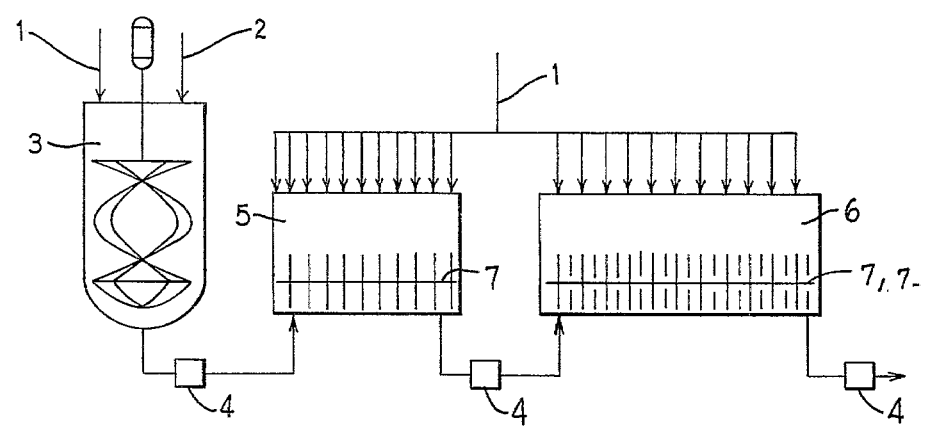
FIG. 3 is a flow sheet of an embodiment of a process according to the invention. In the drawing, the reference numerals identify the following elements.

During the period from the start of the polymerization until the passage of about 180 minutes, samples in limited amounts were collected and analyzed with the results shown in FIG. 2. It can be seen from the drawing that the maleic anhydride content (about 10%) in the resulting polymer and the solid content (about 30%) after shifting to the continuous polymerization were adjusted extremely well to a constant value. As a matter of fact, the polymer solution withdrawn from the first stage (preparatory) polymerization tank was extremely transparent and it could be observed obviously that no polymer having an abnormal copolymer composition was formed during polymerization.

As the second stage polymerization apparatus, there was employed one which had one horizontal shaft equipped with 10 equidistant circular blades.

The third stage polymerization apparatus was a type including two shafts fitted alternately with 22, in total, of frame-type blades rotating in the same rotating direction. The polymerization conditions were set assuming that each apparatus was a reactor having 11 perfectly mixed tanks.

While the polymerization solution was being transferred from the first stage polymerization tank to the second polymerization tank at a rate of 85.8 Kg/hr., maleic anhydride was continuously added to the successive perfectly mixed tanks at the rates of 0.277, 0.265, 0.253, 0.241, 0.230, 0.220, 0.210, 0.201, 0.191, 0.183 and 0.174 Kg/hr., respectively. While this polymerization solution (polymerization ratio 54.8%) was being transferred to the third stage polymerization tank at a rate of 88.2 Kg/hr., maleic anhydride was continuously added at the successive perfectly mixed tanks in the third polymerization tank at rates of 0.167, 0.159, 0.152, 0.145, 0.138, 0.132, 0.126, 0.120, 0.115, 0.109 and 0.104 Kg/hr., respectively. The solid content in the polymerization solution discharged from the third stage polymerization stage was 70.3% and the maleic anhydride content in the formed copolymer was 10.3%. The polymerization temperature was 140° C. at both second and third stages.

The addition amounts of maleic anhydride in the second and third stage polymerization tanks were calculated from the aforementioned equation (III) (with the proviso that $P_1$=0.9, $K_1$=0.9966, $\tau$=0.15 hr., r=0.354/hr).

As can be appreciated from the abovementioned results, the solid content in the polymerization mixture is very high and the composition of the styrene-maleic anhydride copolymer obtained in accordance with the process of the present invention is uniform and transparent and has the intended composition (maleic anhydride 10%). The viscosity of the solution was 0.72 dl/g.

What is claimed is:

1. A continuous bulk polymerization process for preparing a substantially uniform copolymer consisting essentially of from 60 to 95% by weight of units of aromatic vinyl monomer, from 40 to 5% by weight of units of maleic anhydride monomer and from 0 to 30 wt. % of units of third copolymerization monomer which is different from said aromatic vinyl monomer and said maleic anhydride monomer, which comprises the steps of continuously feeding a mixture of said monomers having a composition effective to form said copolymer into a vertical, first-stage, polymerization tank means equipped with agitating means, continuously agitating said mixture in said first-stage polymerization tank means and maintaining bulk polymerization reaction conditions in said first-stage polymerization tank means effective to obtain a partial conversion of said monomers to said copolymer and to obtain a polymerization liquid containing from 30 to 60 wt. % of solids of said copolymer; continuously withdrawing said polymerization liquid from said first-stage polymerization tank means and feeding it into one horizontal end of an elongated, horizontal, second-stage apparatus effective for processing highly viscous materials, said second-stage apparatus being equipped with horizontal rotary shaft means having a series of blade members mounted thereon at horizontally spaced-apart locations and extending outwardly therefrom so as to divide said second-stage apparatus into a series of horizontally displaced mixing zones, continuously rotating said shaft means and thereby continuously mixing said polymerization liquid in said mixing zones while moving said polymerization liquid from one mixing zone to the next so that said polymerization liquid moves to the opposite horizontal end of said second-stage apparatus, maintaining bulk polymerization reaction conditions in said second-stage apparatus effective to obtain a further conversion of said monomers to said copolymer as said polymerization liquid moves toward said opposite horizontal end of said second-stage apparatus to obtain a polymerization reaction product containing from 60 to 95 wt. % of solids of said copolymer, and continuously, separately adding divided quantities of maleic anhydride monomer to said polymerization liquid at a plurality of horizontally spaced-apart locations in said second-stage apparatus wherein the amount of maleic anhydride monomer added at said locations progressively diminishes toward said opposite horizontal end of said second-stage apparatus so as to continuously obtain a uniform copolymer containing a substantially constant amount of maleic anhydride.

2. A process as claimed in claim 1 in which the polymerization reaction product continuously discharged from said second-stage apparatus is continuously fed into one end of an elongated, horizontal, third-stage apparatus effective for processing highly viscous materials, said third-stage apparatus being equipped with horizontal rotary shaft means having a series of blade members mounted thereon at horizontally spaced-apart locations and extending outwardly therefrom so as to divide said third-stage apparatus into a series of horizontally displaced mixing zones, continuously rotating said shaft means and thereby continuously mixing said polymerization liquid in said mixing zones while moving said polymerization liquid from one mixing zone to the next so that said polymerization liquid moves to the opposite horizontal end of said third-stage apparatus, maintaining bulk polymerization reaction conditions in said third-stage apparatus effective to obtain a further conversion of said monomers to said copolymer as said polymerization liquid moves toward said opposite horizontal end of said third-stage apparatus to obtain a polymerization reaction product containing from 60 to 95 wt. % of solids of said copolymer, and continuously, separately adding divided quantities of maleic anhydride monomer to said polymerization liquid at a plurality of horizontally spaced-apart locations in said third-stage apparatus wherein the amount of maleic anhydride monomer added at said locations progressively diminishes toward said opposite horizontal end of said third-stage apparatus so as to continuously obtain a uniform copolymer containing a substantially constant amount of maleic anhydride.

3. A process as claimed in claim 1, in which the reaction temperature in the first stage is in the range between 80° C. and 160° C. and the reaction temperature in the second stage is in the range between 80° C. and 180° C.

4. A process as claimed in claim 2, in which the reaction temperature in the first stage is in the range between 80° C. and 160° C. and the reaction temperatures in the second and third stages are in the range between 80° C. and 180° C.

5. A process as claimed in claim 1, in which the aromatic vinyl monomer and the maleic anhydride monomer are fed into the first stage in the composition ratio and amount calculated according to formulas IIa and IIb and maleic anhydride is fed into the second stage in the amounts calculated according to formula III, provided that each calculated value can vary with an allowance of 20%:

$$\frac{Sa}{Ma} = \frac{K_1 - P(K_1 - P_1)}{1 - K_1 + P(K_1 - P_1)} \quad \text{(II-a)}$$

Amount of introduction:

$$W \cdot r \cdot (1/P - 1)/t \quad \text{(II-b)}$$

wherein, $Sa/Ma$ = aromatic vinyl monomer-maleic anhydride monomer composition ratio to be continuously introduced $P$ = steady state conversion during continuous polymerization (solid content)

$W$ = total feed quantity of monomers $r$ = rate of polymerization (Kg/Kg/unit time)

$t$ = the same time as that used as the unit of the rate of polymerization $r$ $P_1$ = weight percentage of aromatic vinyl monomer units in the copolymer $K_1$ = weight percentage of aromatic vinyl monomer initially fed Amounts of maleic anhydride to be added =

$$\frac{Z_o(1 - C_o)\left(1 - \frac{P_1}{X}\right)\tau r'}{\left(\frac{P_1}{X}\tau r' + 1\right)^n} \quad \text{(III)}$$

where:

$Z_o$ = amount of solution fed to second stage apparatus $C_o$ = percentage of polymer content in the solution fed to second stage apparatus $n$ = the number of tanks ($n = 1, 2 \ldots n$, the maximum of $n$ corresponds to equivalent number of perfectly mixed tanks in the second stage)

$P_1'$ = weight percentage of aromatic vinyl monomer in copolymer inside second stage apparatus $X$ = average weight percentage of aromatic vinyl monomer in monomers inside second stage apparatus $\tau$ = residence time (hr)

$r'$ = rate of polymerization (Kg/Kg/hr)

6. A process as claimed in claim 2, in which the aromatic vinyl monomer and the maleic anhydride monomer are fed into the first stage in the composition ratio and amount calculated according to formulas IIa and IIb and maleic anhydride is fed into the second and third stages in the amounts calculated according to formula III, provided that each calculated value can vary with an allowance of 20%:

$$\frac{Sa}{Ma} = \frac{K_1 - P(K_1 - P_1)}{1 - K_1 + P(K_1 - P_1)} \qquad \text{(II-a)}$$

Amount of introduction:

$$W \cdot r \cdot (1/P - 1)/t \qquad \text{(II-b)}$$

wherein, $Sa/Ma$ = aromatic vinyl monomer-maleic anhydride monomer composition ratio to be continuously introduced $P$ = steady state conversion during continuous polymerization (solid content)

$W$ = total feed quantity of monomers $r$ = rate of polymerization (Kg/Kg/unit time)

$t$ = the same time as that used as the unit of the rate of polymerization $r$ $P_1$ = weight percentage of aromatic vinyl monomer units in the copolymer $K_1$ = weight percentage of aromatic vinyl monomer initially fed Amounts of maleic anhydride to be added =

$$\frac{Z_o(1 - C_o)\left(1 - \dfrac{P_1}{X}\right)\tau r'}{\left(\dfrac{P_1}{X}\tau r' + 1\right)^n} \qquad \text{(III)}$$

where:

$Z_o$ = amount of solution fed to second or third stage apparatus $C_o$ = percentage of polymer content in the solution fed to second or third stage apparatus $n$ = the number of tanks (n = 1, 2 ... n, the maximum of n corresponds to equivalent number of perfectly mixed tanks in the second or third stage apparatus $P_1'$ = weight percentage of aromatic vinyl monomer in copolymer inside second or third stage apparatus $X$ = average weight percentage of aromatic vinyl monomer in monomers inside second or third stage apparatus $\tau$ = residence time (hr)

$r'$ = rate of polymerization (Kg/Kg/hr)

7. A process as claimed in claim 1, in which, during start-up of the process, maleic anhydride monomer is fed into the first stage according to formula I until steady-state operation has been attained, provided that the amount can vary with an allowance of 20% above or below from the calculated value Amount of maleic anhydride to be added =

$$W_o \cdot r \cdot \left(1 - \frac{P_1}{K_1}\right) \cdot \left(1 - \frac{P_1}{K_1} \cdot r\right)^{m-1} \qquad \text{(I)}$$

where:

$W_o$ = total monomer amount initially fed (Kg)

$r$ = rate of polymerization (Kg/Kg/unit time)

$K_1$ = percentage of aromatic vinyl monomer in the monomer initially fed (weight ratio)

$P_1$ = percentage of aromatic vinyl component in the formed copolymer (weight ratio)

$m$ = frequency of addition of maleic anhydride

8. A process as claimed in claim 1, in which two or more vertical polymerization tanks are used in the first stage.

9. A process as claimed in claim 2 in which the conversion in the second stage is in the range between 40 and 80% and that of the third stage is in the range between 60 and 90%.

* * * * *

UNITED STATES PATENT AND TRADEMARK OFFICE
CERTIFICATE OF CORRECTION

PATENT NO. : 4 328 327
DATED : May 4, 1982
INVENTOR(S) : Atsushi Tanaka et al

It is certified that error appears in the above—identified patent and that said Letters Patent is hereby corrected as shown below:

Column 11, line 4; change "copolymerization" to ---copolymerizable---.

Column 12, line 57; and
Column 14, line 1; change the formula to read as follows:

$$--- \quad \frac{Z_o(1-C_o)(1-\frac{P_1'}{X})\tau r'}{(\frac{P_1}{X}\tau r' + 1)^n} \quad \ldots \ldots \quad (III) \quad ---.$$

Signed and Sealed this

Seventeenth Day of August 1982

[SEAL]

Attest:

Attesting Officer

GERALD J. MOSSINGHOFF
Commissioner of Patents and Trademarks